United States Patent
Morikawa et al.

(10) Patent No.: US 7,399,084 B2
(45) Date of Patent: Jul. 15, 2008

(54) LASER IMAGE DISPLAY APPARATUS

(75) Inventors: Akihiro Morikawa, Osaka (JP); Ken'ichi Kasazumi, Osaka (JP); Kiminori Mizuuchi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 246 days.

(21) Appl. No.: 10/576,067

(22) PCT Filed: Apr. 6, 2005

(86) PCT No.: PCT/JP2005/006790

§ 371 (c)(1), (2), (4) Date: Apr. 14, 2006

(87) PCT Pub. No.: WO2005/098532

PCT Pub. Date: Oct. 20, 2005

(65) Prior Publication Data

US 2007/0058135 A1      Mar. 15, 2007

(30) Foreign Application Priority Data

Apr. 9, 2004    (JP) .............. 2004-115276

(51) Int. Cl.
*G03B 21/14*    (2006.01)
(52) U.S. Cl. .............. 353/31; 349/64; 359/599
(58) Field of Classification Search ............ 353/31, 353/34, 37; 349/5, 7, 8, 64; 359/578, 579, 359/599; 348/750
See application file for complete search history.

(56) References Cited

U.S. PATENT DOCUMENTS 4,035,068 A     7/1977  Rawson
4,155,630 A *   5/1979  Ih ........................... 359/707
6,092,900 A     7/2000  Diedrich et al.
6,577,429 B1    6/2003  Kurtz et al.
6,594,090 B2 *  7/2003  Kruschwitz et al. ......... 359/707
6,606,173 B2 *  8/2003  Kappel et al. ............... 359/15
6,910,774 B2 *  6/2005  Troyer ....................... 353/31
7,152,977 B2 * 12/2006  Ruda et al. .................. 353/37
7,271,962 B2 *  9/2007  Kasazumi et al. .......... 359/707
2002/0075460 A1 6/2002  Kappel et al.

FOREIGN PATENT DOCUMENTS

| JP | 55-65940     | 5/1980 |
| JP | 3-109591     | 5/1991 |
| JP | 6-208089     | 7/1994 |
| JP | 11-218726    | 8/1999 |
| JP | 2003-98476   | 4/2003 |
| JP | 2003-279889  | 10/2003 |
| JP | 2004-138669  | 5/2004 |
| JP | 2004-525390  | 8/2004 |
| JP | 2005-84117   | 3/2005 |
| WO | 02/10855     | 2/2002 |

* cited by examiner

*Primary Examiner*—William C. Dowling
(74) *Attorney, Agent, or Firm*—Wenderoth, Lind & Ponack, L.L.P.

(57) ABSTRACT

A light diffuser containing light diffusing elements is arranged in the most appropriate position between a spatial light modulator and an illumination optical system. Thereby, particles as light diffusing elements diffuse rays of light emitted from a laser light source. Accordingly, indefinite numbers of speckle pattern are formed so that, for example, a speckle noise which occurs on an image projected to a screen is reduced. As a result, loss of light amount after light diffusion is suppressed to small amount, and thereby a laser image display apparatus capable of displaying a bright and high-quality image having no luminosity irregularity is provided.

26 Claims, 7 Drawing Sheets

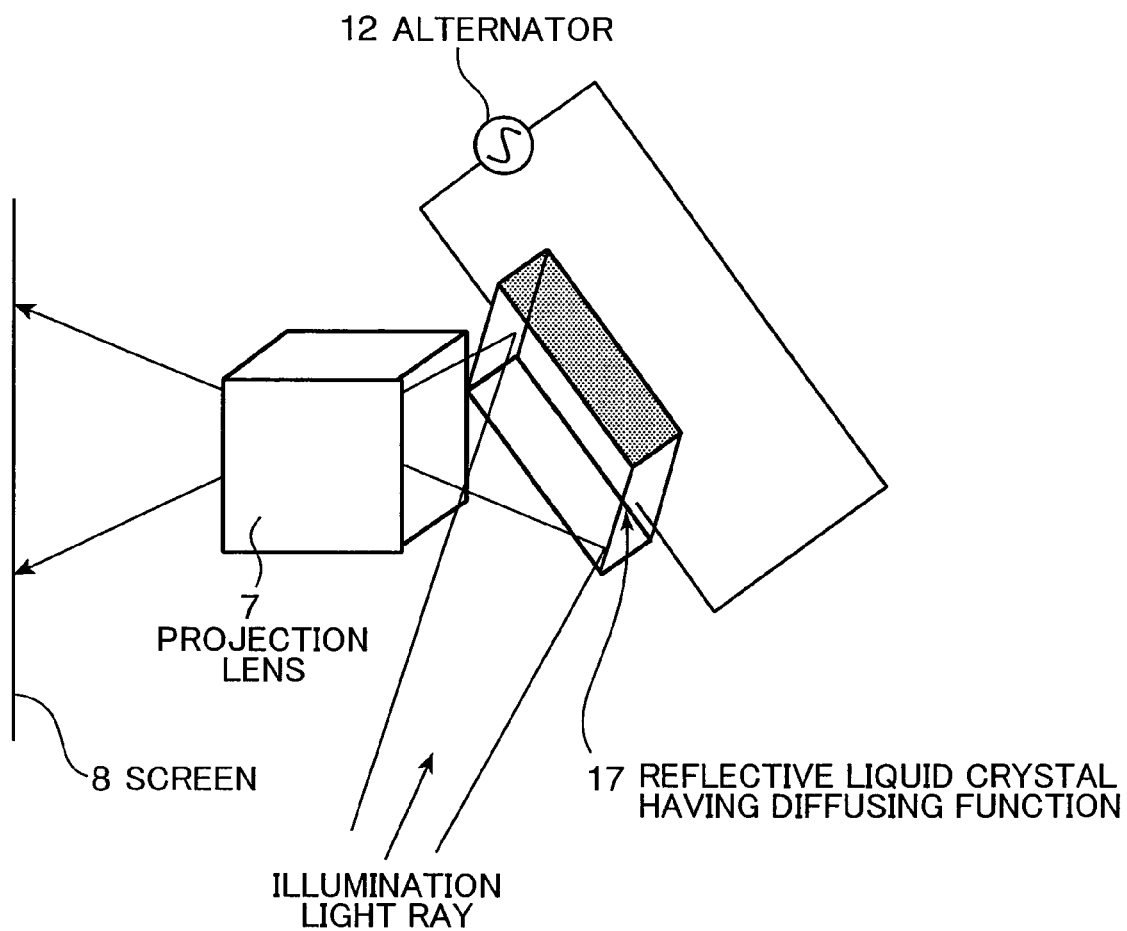

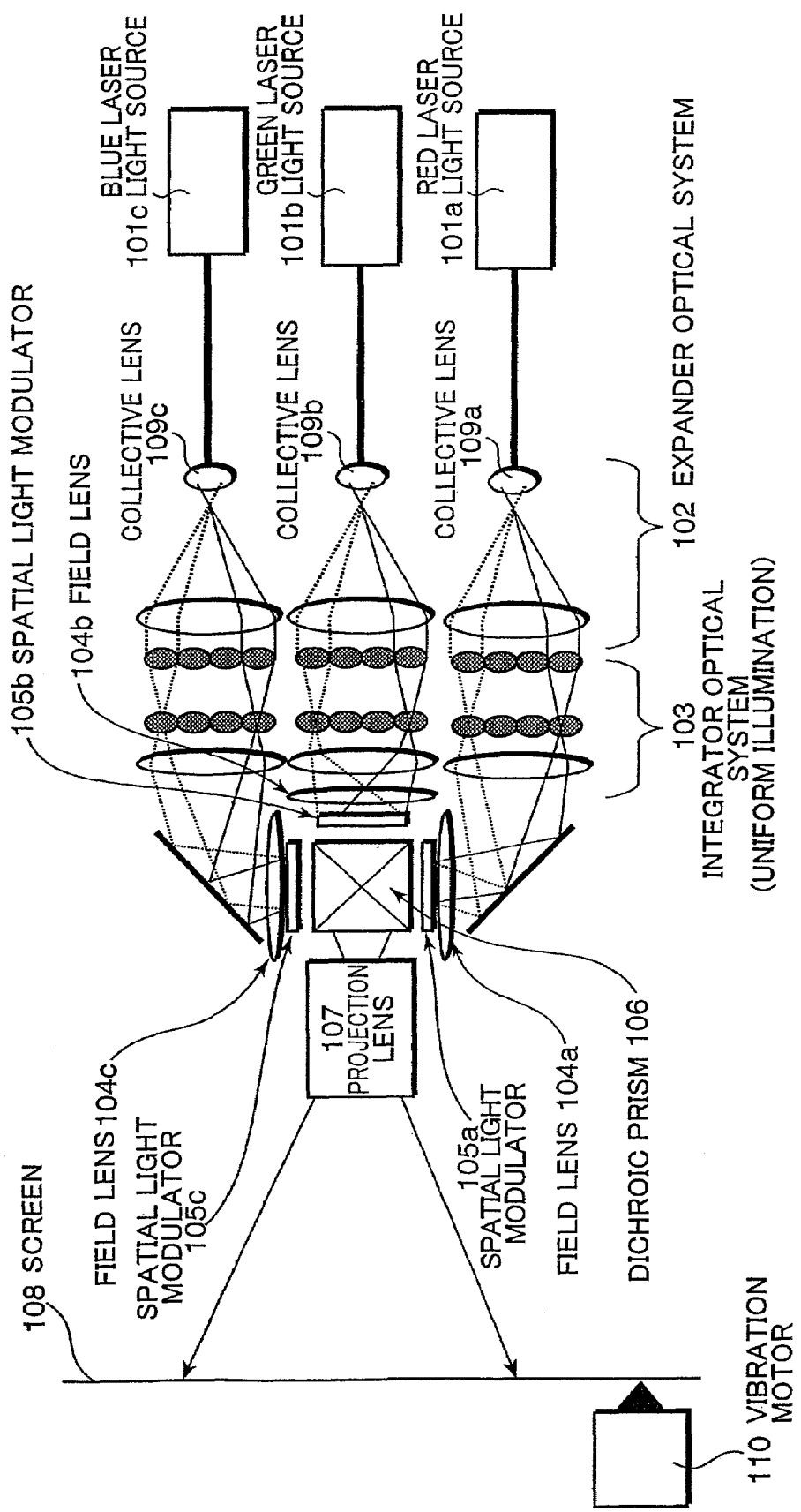
PRIOR ART FIG.7

LASER IMAGE DISPLAY APPARATUS

TECHNICAL FIELD

The present invention relates to an image display apparatus using a laser as a light source. More particularly, it pertains to a laser image display apparatus comprising means for reducing speckle noises which appears on a display.

BACKGROUND ART

FIG. 7 shows a schematic construction of a conventional laser display. At first, rays of light emitted from laser light sources 101a-101c including three RGB colors (R: red, G: green, B: blue) are beam-expanded by an expander optical system 102 including collective lens 109a-109c. Next, expanded light rays are beam-formed by an integrator optical system including lenses and arrays of small lenses to provide a uniform illumination to a spatial light modulator 105. Herein, field lenses 104a-104c are adapted for converting the rays of light having been passed through the spatial light modulators 105a-105c into collected or collected light rays so as to make rays of light pass through an aperture of a projection lens 107 efficiently.

Then, an intensity modulation is executed to the beam-formed rays of light in the spatial light modulators 105a-105c in response to an input image signal, and the rays of light are combined in a dichroic prism 106. A combined ray of light is diverged in the projection lens 107 and projected to a screen 108. Accordingly, a two-dimensional image is displayed on the screen 108. In the display having this construction, the light sources for RGB respectively emit single color lights. Accordingly, an image having high color purity and brightness can be displayed by using laser light sources having appropriate wavelength.

However, such display has a problem of the so-called speckle noise which is likely to occur due to use of a laser light source having high coherency. The speckle noise is fine irregular noises which occur when rays of laser light are diffused on the screen 8 and the diffused light rays on respective portions of the screen 8 interfere with each other.

Conventionally, as disclosed in Patent Document 1, the speckle noise is eliminated by operating a motor 110 to oscillate a screen 108 or, as disclosed in Patent Document 2, by applying an external force to oscillate/rotate a diffuser. These methods change the speckle pattern within a time segment shorter than a display changing time which enables the human to see to average out a speckle pattern so that the observer cannot see the speckle noise. Further, Patent Document 3 discloses a method which prevents the speckle noise by changing a state of polarization of a laser light in a time frame and projects the laser light to a screen on which particles made of anisotropic crystals are applied.

Further, as described in Patent Document 4, the speckle noise can be reduced also by using a mobile diffuser, but there is a problem of noises such as motor driving sounds generated at the time when the diffuser is operated. To prevent sound noises caused by operation of a motor and the like, accordingly, Patent Document 5 discloses a method which prevents the speckle noise at a low cost without mechanical operation using a light diffusing optical system where microparticles are contained in a cell and the microparticles are electrically oscillated. However, in the case of using the speckle reducing method disclosed in Patent Document 5, the light rays diffused in the diffuser optical system are more likely to partially come outside of an image display area of the spatial light modulator as the distance between the spatial light modulator and the diffuser optical system becomes longer. As a result, the loss in the light intensity becomes larger, and the brightness of the screen lowers.

Furthermore, in the case of the diffuser optical system using microparticles, the microparticles in the cell are deviated so that a local diffusing angle and transmittance efficiency in the diffuser optical system differs at different locations. Therefore, as the distance between the diffuser optical system and the spatial light modulator comes closer, this deviated distribution of transmittance efficiency causes localization (luminosity irregularity) of light intensity on the spatial light modulator. The luminosity irregularity moves on the projection display following a movement of the diffuser optical system, and consequently runs over an image. Accordingly, in order to suppress image deterioration due to the luminosity irregularity, it is necessary to arrange the diffuser apart from the spatial light modulator with a predetermined distance.

In other words, speckle noise prevention optical systems, typically diffuser optical systems using microparticles, cannot eliminate the speckle noise and realize a high-resolution, bright image having no luminosity irregularity if the optical system is not set in an appropriate position with respect to the spatial light modulator. However, an appropriate positional relationship between the diffuser optical system and the spatial light modulator has not been discussed until now.

Patent Document 1:
    Japanese Unexamined Patent Publication No. Sho55-65940

Patent Document 2:
    Japanese Unexamined Patent Publication No. Hei6-208089

Patent Document 3:
    Japanese Unexamined Patent Publication No. Hei3-109591

Patent Document 4:
    Japanese Unexamined Patent Publication No. 2003-98476

Patent Document 5:
    Japanese Unexamined Patent Publication No. Hei11-218726

DISCLOSURE OF THE INVENTION

In view thereof, an object of the present invention is to solve the problems, and provide a laser image display apparatus which can efficiently reduce an inherent speckle noise appearing in the case where a coherent light source such as a laser source and the like is used, and realizes a bright and high-quality image having no luminosity irregularity.

To achieve this object, the laser image display apparatus according to an embodiment of the present invention comprises: a laser light source; a light diffuser containing light diffusing elements, the light diffusing elements moving, swaying or oscillating; an illumination optical system which irradiates rays of light from the laser light source to the light diffuser; a spatial light modulator which is arranged near the light diffuser and irradiated by rays of light diffused by the light diffuser to produce image; and a projection lens which projects to a predetermined plane in space an image produced by the spatial light modulator, wherein a light diffusing angle θ of the light diffuser, a pitch P of transmission irregularity generated in the light scattering means, a numerical aperture NA of the illumination optical system, and a distance L between the spatial light modulator and the light diffuser have a relationship of $P<2\times\tan(\theta/2+\mathrm{Sin}^{-1}(NA))\times L$.

With this construction, a ray of light emitted from the laser light source is irradiated to the light diffuser from the illumination optical system. Light diffusing elements are enclosed in the light diffuser, and the ray of light irradiated from the illumination optical system is diffused by the light diffusing elements. At this time, the light diffusing elements are moved, swayed or oscillated so that a phase pattern of the diffused rays of light changes instantly, and thereby a speckle pattern also changes. In other words, since different speckle patterns occur at each moment and these speckle patterns are timely averaged out at the time when an image projected to a particular plane via a spatial light modulator and a projection lens is observed, a high-quality two-dimensional image having a suppressed speckle noise can be obtained.

Further, divergence of the incident ray of light irradiated from the illumination optical system to the light diffuser is expressed by $\theta/2+\mathrm{Sin}^{-1}(NA)$ if it is assumed that a numerical aperture of the illumination optical system is NA and a full angle of a light diffusing angle of the light diffuser is $\theta$. Accordingly, if a distance between the light diffuser and the spatial light modulator is L, divergence of the ray of light on the spatial light modulator can be expressed by $2\times\tan(\theta/2+\mathrm{Sin}^{-1}(NA))\times L$. If the divergence is larger than a pitch P of a transmittance irregularity (luminous irregularity of a transmitted light ray) generated in the light diffuser, rays of light forming irregularity adjacent to each other are diffused and overlap with each other. Consequently, lowering of an image quality due to an irregularity can be suppressed.

BRIEF DESCRIPTION OF THE DRAWINGS

FIG. 6 is a schematic diagram showing an optical system having a combination of function of a diffuser and a spatial light modulator in the embodiment 3 of a laser image display apparatus of the present invention.

FIG. 7 is a schematic diagram showing a conventional laser display.

BEST MODE FOR CARRYING OUT THE INVENTION

Embodiments of the present invention are now described with reference to the drawings.

Embodiment 1

Figure 1:
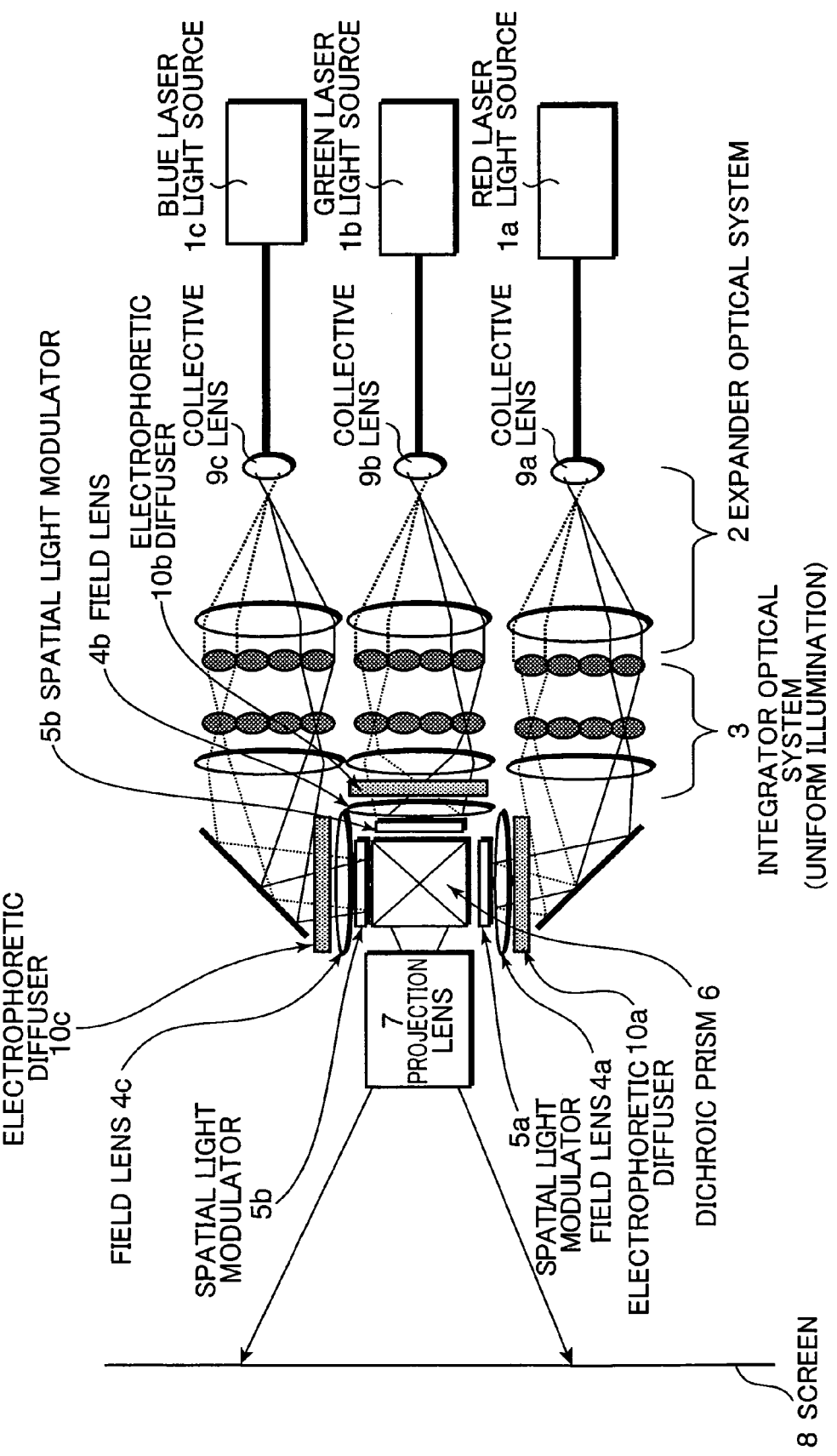
FIG. 1 is a schematic diagram showing an embodiment 1 of a laser image display apparatus according to the present invention.

FIG. 1 shows a schematic diagram of a laser image display apparatus according to an embodiment of the present invention. Rays of light emitted from a red laser light source 1a, a green laser light source 1b, and a blue laser light source 1c are collected by collective lens 9a, 9b and 9c respectively. The collected rays of light are irradiated to electrophoretic diffusers (light diffusers) 10a, 10b, 10c respectively after being passed through an expander optical system 2 and an integrator optical system (illumination optical system) 3 and are beam-shaped to have a uniform light intensity distribution. The rays of light irradiated to the electrophoretic diffusers 10a, 10b, 10c are diffused by diffusing elements contained. therein. Consequently, directions of the rays of light after being passed through the electrophoretic diffuser 10a, 10b, 10c are diffused.

The rays of laser light diffused by the electrophoretic diffusers 10a, 10b, 10c are irradiated to spatial light modulators 5a, 5b, 5c including a liquid crystal panel and the like, for example, to produce a two-dimensional image. The rays of light after being passed through the respective spatial light modulators 5a, 5b, 5c are combined in a dichroic prism and projected to a screen 8 by a projection lens 7.

Herein, field lens 4a, 4b, 4c are adapted for converting the rays of light having been passed through the spatial light modulators 5a to 5c into collected beams to pass the rays of light through an aperture of the projection lens efficiently. As the laser light sources, 1a, 1b, and 1c, further, a gas laser such as He—Ne laser, He—Cd laser and Ar laser, a semi-conductor laser such as AlGaln laser and GaN laser, or an SHG laser having solid laser as basic wave are used.

Figure 2:
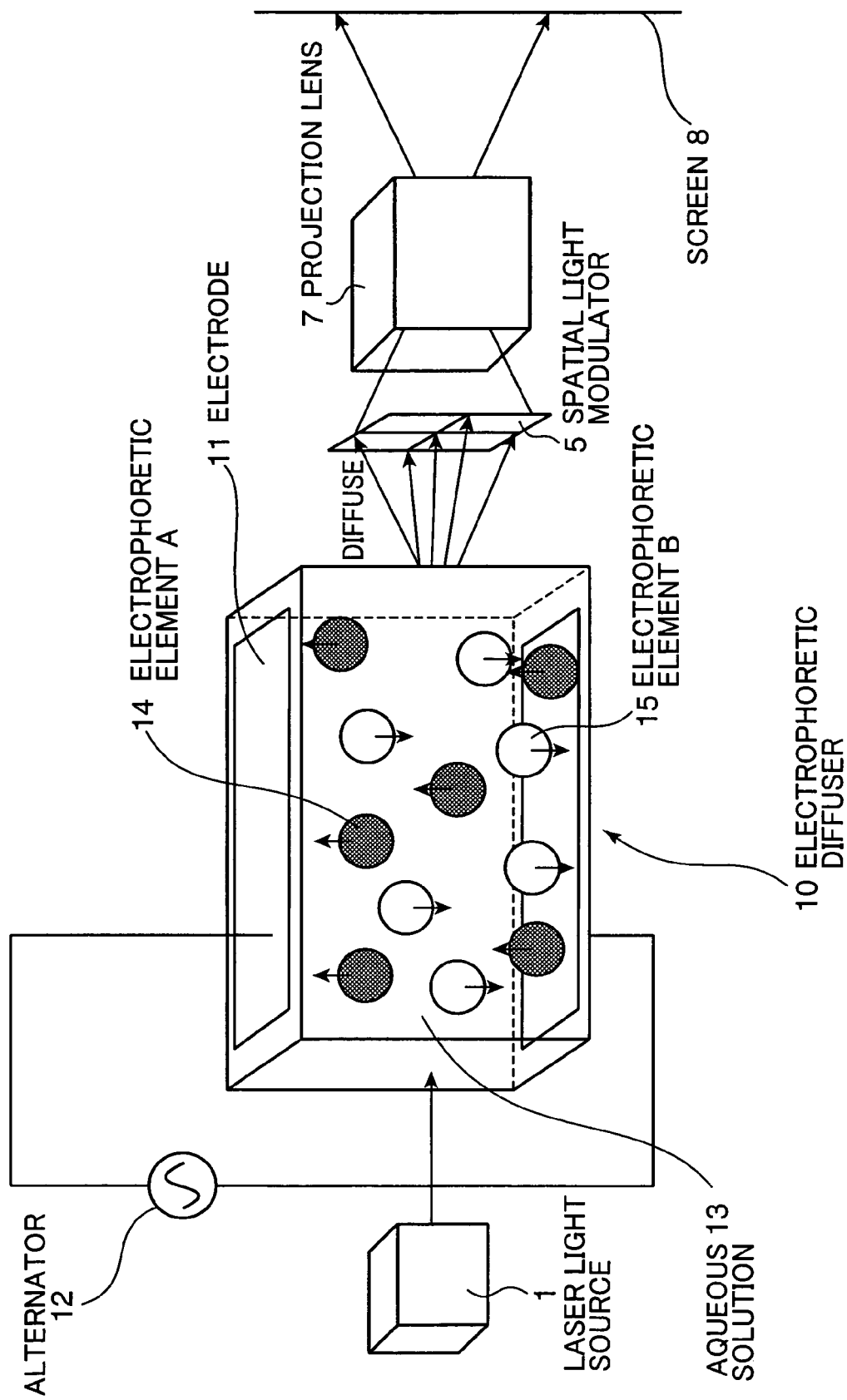
FIG. 2 is a schematic diagram showing a component of a laser image display apparatus of the present invention including an electrophoretic diffuser in an embodiment 1.

A speckle suppression operation of the laser image display apparatus including the construction shown in FIG. 1 is described with reference to FIG. 2. FIG. 2 is a schematic diagram showing an optical system of the laser image display apparatus shown in FIG. 1 for one color. For simplicity, the expander optical system, the integrator optical system, the field lens and the dichroic prism are omitted. The rays of light which have emitted from the laser light source 1 and passed through the integrator optical system are formed into a light beam on the electrophoretic diffuser 10 having a uniform intensity distribution. The light beam is diffused in the electrophoretic diffuser 10 and irradiated to the spatial light modulator 5 at a uniform intensity distribution. The rays of light are applied with an intensity modulation by the spatial light modulator 5, and passed through the projection lens 7 so that an expanded image is projected to the screen 8.

Here, it should be noted that there is the possibility that a speckle noise appears on an image projected to the screen 8 at a given time. However, in the course where the light beam passes through the electrophoretic diffuser 10, electrophoretic elements A14 or electrophoretic elements A15 contained in an aqueous solution 13 as solvent 13 in the electrophoretic diffuser diffuse the light beam so that the phase pattern of the rays of light after being passed through the electrophoretic diffuser 10 changes. Accordingly, the pattern of speckle noise occurring in the image on the screen 8 also changes. In this embodiment, as the light diffusing particles contained in the electrophoretic diffuser are used particles which are able to move, sway or oscillate owing to application of a voltage, for example, particles including $TiBaO_3$ and the like which is able to undergo induced polarization. Such particles are referred to as migration particles hereinafter.

In this case, electrodes 11 are formed at both ends of the electrophoretic diffuser, and an alternating voltage is applied to the electrodes 11, and thereby migration particles in the electrophoretic diffuser move, sway or oscillate in response to modulated frequencies and the like of the alternating voltage. Consequently, the distribution of migration particles in a given plane in the electrophoretic diffuser changes at each moment, and thereby the speckle pattern appearing changes at each moment. In other words, since a different speckle pattern appears at each moment, the speckle patterns are averaged out at the time of observing a projected image, which makes it possible to observe a two-dimensional image having suppressed speckle noise. It will be seen that the greater the modulated frequency of the alternating voltage or the changing width of the alternating voltage to allow migration particles in the electrophoretic diffuser 10 to move, sway or oscillate is made, the greater the spatial distribution of electrophoretic particles in the electrophoretic diffuser 10 changes. Consequently, the averaged speckle noise, which is sensed by human's eyes, can be more suppressed.

Figure 3:
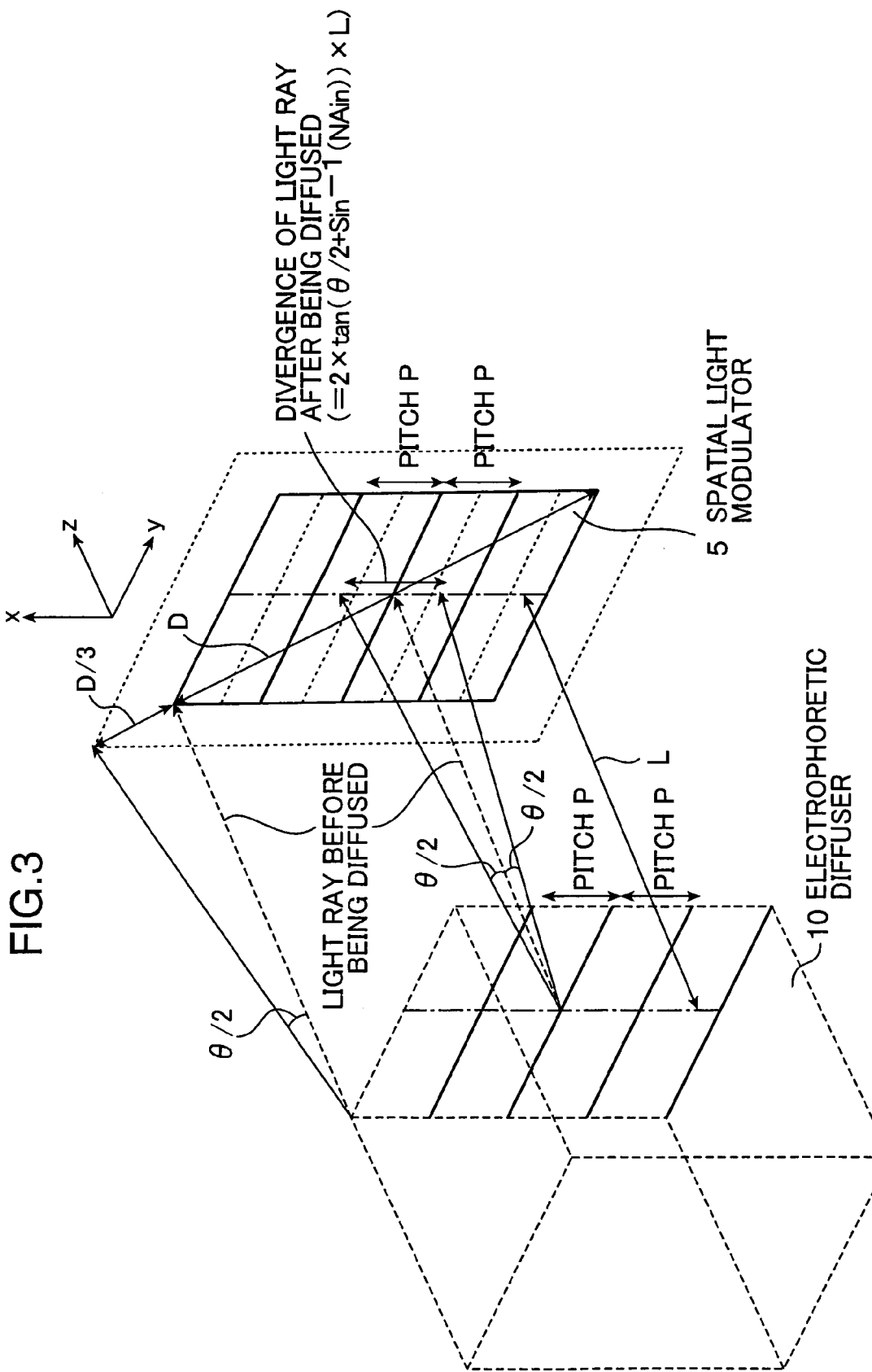
FIG. 3 is a diagram showing divergence of rays of light to be diffused by an electrophoretic diffuser 10 in an embodiment 1 of a laser image display apparatus of the present invention.

To use the electrophoretic diffuser effectively, further, it is necessary to specify a distance between the electrophoretic diffuser 10 and the spatial modulator 5 other than the above-described moving speed determined mainly by the modulated frequency. FIG. 3 is a diagram showing a divergence of rays of light diffused by the electrophoretic diffuser 10 in the embodiment 1 of the laser image display apparatus.

Assuming that the numerical aperture of the integrator optical system 3 is NA, a divergence of rays of light irradiated from the integrator optical system 3 to the electrophoretic diffuser 10 is expressed by $\sin^{-1}(NA)$ regardless of light incidence positions of the electrophoretic diffuser 10. The bean of light is shown in a phantom line as light before being diffused in this figure. Assuming that the full diffusing angle of the electrophoretic diffuser 10 is θ, the beam of light (shown by the phantom line in the figure) is diffused θ/2 conically with respect to an axis of the beam of light before being diffused by the electrophoretic diffuser 10. Consequently, the divergence angle of rays of light having been passed through the electrophoretic diffuser 10 is added with a further divergence angle of θ/2, and thus expressed by $θ/2 + \sin^{-1}(NA)$.

Assuming that a distance between the electrophoretic diffuser 10 and the spatial light modulator 5 is L, accordingly, the divergence of light on the spatial light modulator 5 is expressed by $2 \times \tan(θ/2 + \sin^{-1}(NA)) \times L$. Here, the numerical aperture NA of the integrator optical system 3 is determined depending upon a numerical aperture of the projection lens 7. Since a projection lens 7 having a large numerical aperture is expensive in general, a projection lens 7 having a small numerical aperture is used in order to bring down costs. Generally, a projection lens having an F value of 1.4 to 2.0 and a numerical aperture of 0.25 to 0.36 is used. Therefore, regardless as to whether or not there is provided the electrophoretic diffuser 10, a numerical aperture NA of the integrator optical system 3 needs to be smaller value than that of the projection lens.

If a distance between the electrophoretic diffuser 10 and the spatial light modulator 5 is larger than a certain limit, a part of the rays of light diffused by the electrophoretic diffuser 10 comes outside of an image display area of the spatial light modulator 5, which results in a larger loss in the light amount, and thereby lowers the brightness on the screen. In order to suppress the loss in the light amount lower than a certain amount, as shown in FIG. 3, the light diffusing angle θ of the electrophoretic diffuser 10 is set so as to satisfy the following equation:

$$\tan(θ/2 + \sin^{-1}(NA)) \times L < D/3 \quad (1)$$

Wherein: NA denotes a numerical aperture of the integrator optical system 3 (an illumination optical system using a light integrator); L denotes a distance between the electrophoretic diffuser 10 and the spatial light modulator 5; and D denotes a diagonal distance of an image display area of the spatial light modulator.

Herein, since the rays of light diffused to the spatial light modulator 5 is not in connection with the light amount loss, the light divergence shown in the left term of Equation 1 is half the above-mentioned light divergence on the spatial light modulator 5.

The light divergence shown in the left term of Equation 1 increases monotonously as the distance L between the electrophoretic diffuser 10 and the spatial light modulator 5 increases, and the brightness on the screen decreases. Further, in the case of using a laser light source having an ordinary brightness and an optical system having the construction shown in FIG. 1, the allowable brightness range where a person can recognize an image on the screen 8 without sense of discomfort is considered to be not lower than 25% of the brightness of the rays of light incidence to the electrophoretic diffuser 10. In other words, if the brightness is lower than 25%, an image on the screen 8 becomes so dark. Therefore, it is necessary to increase the power of the light source or suppress the light amount loss. Suppression of the light amount loss to 75% or lower (i.e., 25% of the irradiated light incidence to the spatial light modulator 5) can be achieved by setting the light divergence smaller than one-third (i.e., D/3) of the diagonal distance of the image display area of the spatial light modulator 5.

In the following paragraphs of the specification, the value of NA does not indicate a determined value under an ideal condition, but a substantial value including an error occurred at the time of manufacturing optical systems constituting the integrator optical system 3 and a displacement occurred at the time of placing the integrator optical system 3. In other words, for example, even though it is designed to have NA=0.2, values near 0.2, such as 0.19 and 0.22, are not excluded.

In the case of using an electrophoretic diffuser 10 having a deviated spatial distribution of migration particles, a local diffusing angle and a transmittance differ depending on a position in the electrophoretic diffuser 10. Therefore, a deviated light intensity distribution occurs on the spatial light modulator 5 due to a transmittance deviation as the electrophoretic diffuser 10 is arranged improperly near the spatial light modulator 5. A luminous irregularity moves on the projection screen following movement of migration particles contained in the electrophoretic diffuser 10, and comes into a projected image. To prevent this, the electrophoretic diffuser 10 is arranged apart from the spatial light modulator 5 a predetermined distance. The electrophoretic diffuser 10 is irradiated in different directions from the respective element lenses of the integrator optical system 3. Therefore, a sufficient distance L between the electrophoretic diffuser 10 and the spatial light modulator 5 is effective to equalize luminous irregularities of light irradiated from the respective element lenses.

Particularly, the light diffusing angle θ of the electrophoretic diffuser 10, a pitch P denoting a luminosity irregularity (transmission irregularity) of the transmitted light on a side of the electrophoretic diffuser 10 facing the spatial light modulator 5, and a distance L between the electrophoretic diffuser 10 and the spatial light modulator 5 are set so as to be in a relationship of $$2 \times \tan(θ/2 + \sin^{-1}(NA)) \times L \quad (2)$$

depending on the numerical aperture NA of the integrator optical system 3. In FIG. 3, a portion having the highest brightness of transmitted light rays on a side of the electrophoretic diffuser 10 facing the spatial light modulator 5 is shown in a solid line running on the electrophoretic diffuser 10 in a lateral direction(y-direction). An interval between portions having highest brightness aligned in a longitudinal direction is a pitch P denoting an irregularity. Normally, irregularity occurs also in a lateral direction (y-direction), but it is omitted in this figure for simplicity. Further, in FIG. 3, a length which is the same as the length of a pitch P on the electrophoretic diffuser 10 is also shown on the spatial light modulator 5 by a lateral (y-direction) solid line. Furthermore, a portion which has an equal distance to solid lines is shown by a dotted line.

If a divergence of the rays of light after being diffused on the spatial light modulator 5 is larger than the pitch P denoting the irregularity of the transmitted light rays, the adjacent rays of light forming irregularity diffuses, and the diffusing rays thereby overlap with each other. In other words, the conditions which satisfy the Equation 2 suppress deterioration of an image quality due to an irregularity.

Further, though it is described above that the pitch P of the irregularity of the transmitted light rays is constant, the value of the pitch does not have to be constant and it can be varied. In such a case, an average of a plurality of values of the pitch P (for example, an arithmetic average) can be newly set as a new constant pitch P.

Furthermore, with reference to the Equation 1 and the Equation 2, it is preferable to set the distance L between the electrophoretic diffuser 10 and the spatial light modulator 5 within a range of $$P/\tan(\theta/2+\sin^{-1}(NA))/2 < L < D/\tan(\theta/2+\sin^{-1}(NA))/3. \quad (3)$$

Normally, the irregularity pitch P of the rays of transmitted light through the diffuser is smaller than 10 times of diameter d of particles in the diffuser. Thus, if the integrator optical system 3 having a numerical aperture of 0.1 is used for example, it should have the distance of 0.26 mm to 2.6 mm or more depending on the particle diameter (10 μm to 100 μm) of the migration particles contained in the diffuser.

Further, though the electrophoresis is used as a means for moving the migration particles in the present embodiment, a heat, a sound wave or a magnetism can be also used as a means for moving, swaying and oscillating the diffusing element to obtain a similar effect. Furthermore, the similar effect can be also obtained by moving, swaying or oscillating a solvent contained with the light diffusing elements.

Further, with regard to the light diffusing elements to be contained, if two or more kinds of particles having different characteristics from one another are mixed, e.g., the particles differ in the moving speed from one another, the spatial distribution of the particles becomes more complicated. Consequently, more numbers of a phase patterns of light beam after being passed through the diffuser are formed, and a number of the speckle pattern increases. Thus, mixing particles having two or more kinds of characteristics is effective to reduce a speckle noise. For example, in the case where the diffuser described above is constructed by a liquid crystal, two or more kinds of liquid crystal having different polarization from one another contained in the diffuser makes different response speed at the time of applying an electric field. Consequently, various diffusing light patterns and a large number of speckle patterns are formed, which effectively reduces the speckle noise.

Further, a particle used as a light diffusing element has, other than the polarization described above, characteristics such as size, mass and density. For example, in the case where particles having the same polarization and density but having different size from one another are contained, small particles move fast and large particles move slowly relative to the small particles at the time when a voltage is applied. In any of the cases above, the particles can have different moving speeds, and thereby the speckle noise can be reduced.

For another example, in the case of using different kinds of migration particles, since the respective response speeds of particles with respect to the electric field differ from one another, more irregular and complicated states of diffusion can be generated as compared to the case of containing one kind of migration particles. Since containing the particles having different response speed depending on an electronic or magnetic effect of particles makes the spatial distribution of particles in the diffuser more complicated, the similar effect with respect to speckle noise reduction can be obtained.

Other than the above, making a moving (swaying, oscillating) speed and a moving (swaying, oscillating) direction of particles random is also effective to generate an irregular diffusion. For example, the spatial distribution of particles in the electrophoretic diffuser 10 can be made more complicated and varied dividing an electrode 11 (transparent electrode,) arranged on the electrophoretic diffuser 10 in some numbers and control each electrode with electric field separately, by forming the divided electrodes 11 to have different shapes from one another and perform electric field control and by arranging another electrode not only to upper and lower sides of the electrode 11 but also on front and far side and perform an electric field control to the electrophoretic diffuser 10 shown in FIG. 2, and thereby the reduction rate of the speckle noise increases. Further, it is not necessary to arrange the electrode described above on the same plane like the electrode 11 shown in FIG. 2, but it may be formed on a plane having a step.

According to the feature of the laser image display apparatus of the present invention, the screen 8 and the electrophoretic diffuser 10 are not oscillated or moved and a sound caused by movement and oscillation is not generated. Accordingly, a quiet laser image display apparatus can be realized.

In the above, the embodiment of the present invention is described with reference to the drawings showing a projection-type display having separated bodies of the projection optical system and the screen. However, the embodiment in the present invention can be applied to a rear-projection type image display apparatus having a combination of a projection optical system and a transparent screen; and a two-dimensional image display apparatus having a type of directly observing the spatial light modulator irradiated by a laser from a rear side (for example, liquid crystal television which is now commercially available).

Further, the embodiment was described with reference to a display apparatus of a color image, but the present invention can be used for an image projection apparatus having a single laser, for example, exposure lighting system used for a semiconductor process. As a spatial light modulator in the exposure lighting system, a photo mask and the like, for example, which is formed by patterning a metal film on a glass motherboard is used and a mask pattern image is formed using a semiconductor motherboard as a screen.

Embodiment 2

Figure 4:
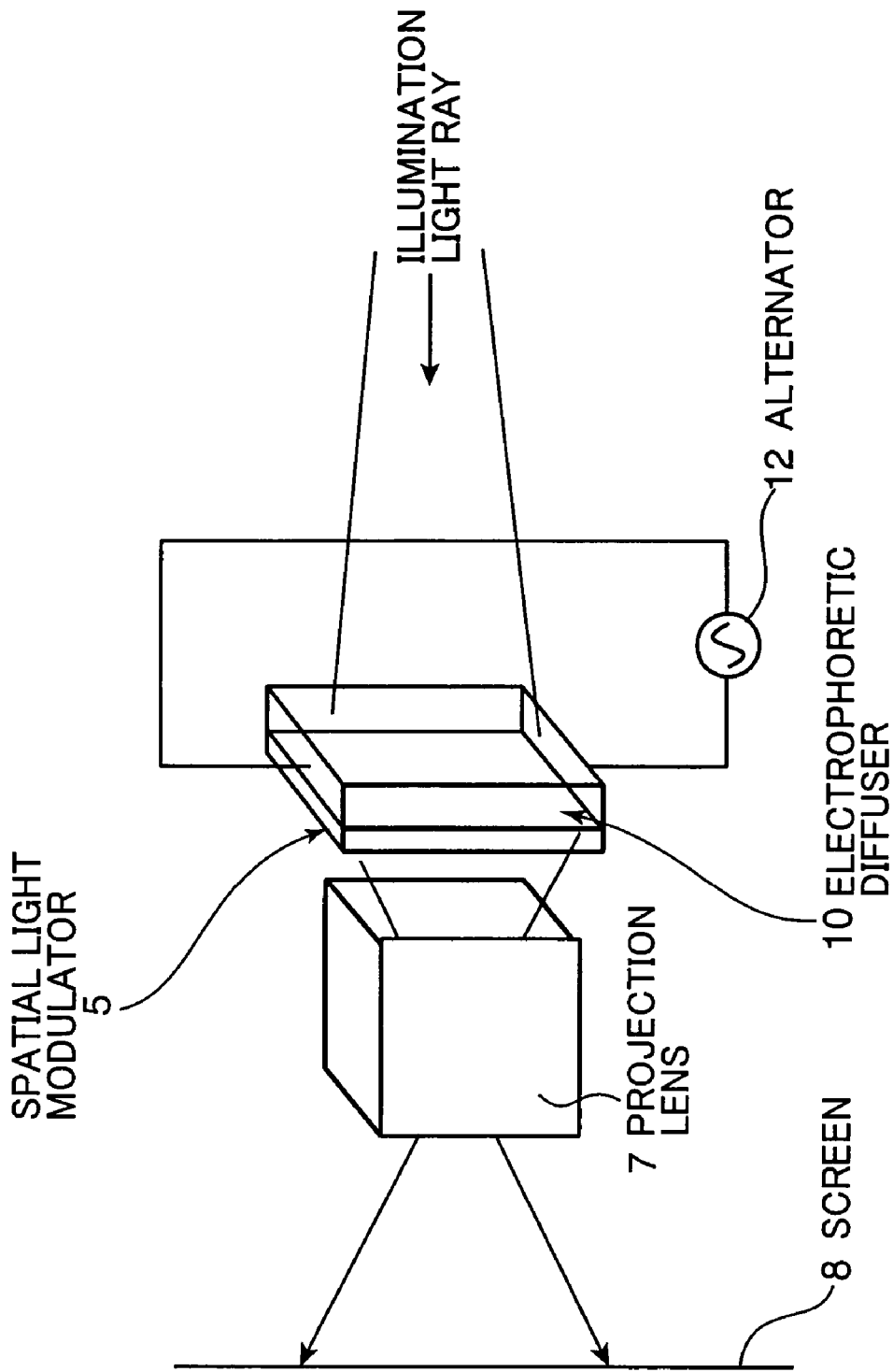
FIG. 4 is a schematic diagram showing an optical system formed by unifying an electrophoretic diffuser and a spatial light modulator in an embodiment 2 of a laser image display apparatus of the present invention.
Figure 5:
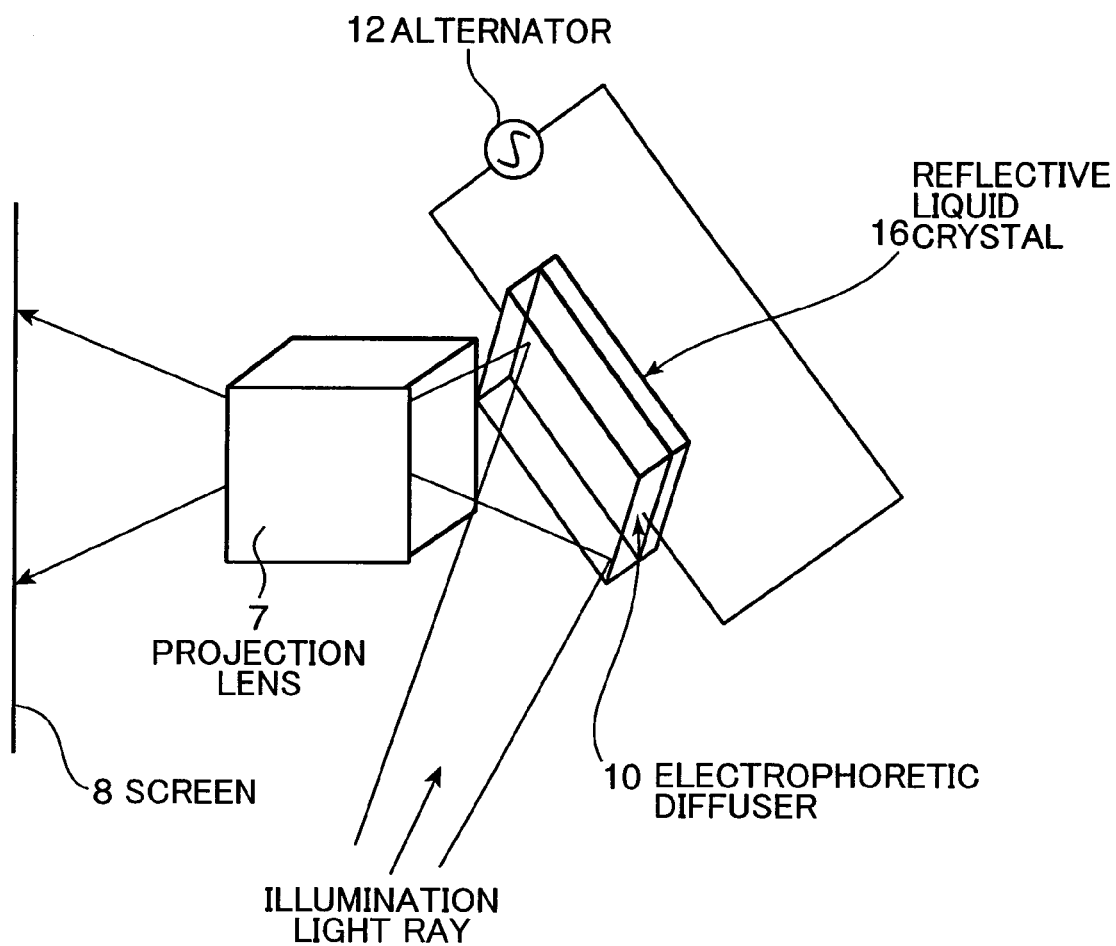
FIG. 5 is a schematic diagram showing an optical system formed by unifying an electrophoretic diffuser and a reflective liquid crystal component in an embodiment 2 of a laser image display apparatus of the present invention.

Further, according to another construction of a laser image display apparatus of the present invention, an electrophoretic diffuser 10 containing light diffusing elements is unified with a spatial light modulator 5 as shown in FIG. 4, and thereby a speckle noise is reduced and eliminated. Herein, the optical system such as the integrator optical system 3 and the like are omitted for simplicity. According to this construction, after the rays of light emitted from the light source having been passed through the expander optical system and the integrator optical system, rays of the light beam can be irradiated to the unified optical system including the electrophoretic diffuser 10 and the spatial light modulator 5 in a state of a uniform illumination light ray. Furthermore, as shown in FIG. 5, it can also be constructed so as to have a reflective spatial light modulator as a spatial light modulator. Here, LCOS (Liquid Crystal On Silicon), which is representative of all other reflective liquid crystal 16, is used as a reflective spatial light modulator. Furthermore, other than the above, if a ferroelectric liquid crystal is used as a reflective liquid crystal, a response speed of a liquid crystal can be made faster and thereby an image having less afterimage can be projected.

Embodiment 3

Further, according to another construction of a laser image display apparatus of the present invention, as shown in FIG. 6, a light diffuser containing light diffusing elements and a liquid crystal used in a two-dimensional spatial light modulator for projecting an image are contained in the same liquid. For example, it functions as a diffuser by moving the particles by heat, and, on the other hand, it functions as a two-dimensional light modulator by controlling a liquid crystal (a reflective liquid crystal is used in FIG. 6) by electricity.

Here, the same as in the embodiment 1, a distance between the diffuser and the light modulator needs to be set in an appropriate position to suppress the light amount loss and the luminosity irregularity to a minimum. Therefore, portions of a light diffusing function and a light modulating function needs to be separated, and the particles and the liquid crystal contained in the same liquid needs to be arranged in an appropriate position.

Other Preferable Embodiment

FIG. 4 and FIG. 5 shows an electrophoretic diffuser 10 as one form of the diffuser. However, the diffuser in the embodiment of the present invention is not limited to it, but it can take a form of containing light diffusing elements which are moved, swayed or oscillated by applying a heat, a sound wave or an electric field. At that time, for example, it is preferable that the light diffusing elements include more than two kinds of materials having different characteristics such as size, mass, intensity or magnetic moment from one another.

General Outline of Embodiment

A general outline of an embodiment of the present invention is described below.

(1) As described above, it is preferable that a laser image display apparatus in the present invention comprises: a laser light source; a light diffuser containing light diffusing elements, the light diffusing elements moving, swaying or oscillating; an illumination optical system which irradiates rays of light from the laser light source to the light diffuser; a spatial light modulator which is arranged near the light diffuser and irradiated rays of light diffused by the light diffuser to produce image; and a projection lens which projects to a predetermined plane in space an image produced by the spatial light modulator, wherein a light diffusing angle θ of the light diffuser, a pitch P of transmission irregularity generated in the light scattering means, a numerical aperture NA of the illumination optical system, and a distance L between the spatial light modulator and the light diffuser have a relationship of $P < 2 \times \tan(\theta/2 + \sin^{-1}(NA)) \times L$.

According to this construction, rays of light emitted from the laser light source are irradiated from the illumination optical system to the light diffuser. Light diffusing elements are contained in the light diffuser, and the rays of light irradiated from the illumination optical system are diffused by the light diffusing elements. At this time, since the light diffusing elements are moved, swayed or oscillated, a phase pattern of the diffused rays changes at each moment, and thereby a speckle pattern changes. In other words, since different speckle patterns occur at each moment. These speckle patterns are timely averaged out at the time when an image projected to a particular plane via a spatial light modulator and a projection lens is observed. Accordingly, a high-quality two-dimensional image with a suppressed speckle noise can be obtained.

Further, divergence of the ray of light irradiated from the illumination optical system to the light diffuser is expressed by $\sin^{-1}(NA)$. Assuming that a full angle of a light diffusing angle of the light diffuser is θ, a further divergence angle of θ/2 is added, and thereby a divergence angle of light rays is expressed by $\theta/2 + \sin^{-1}(NA)$. Accordingly, if a length between the light diffuser and the spatial light modulator is L, a divergence of the ray of light on the spatial light modulator can be expressed by $2 \times \tan(\theta/2 + \sin^{-1}(NA)) \times L$. If the divergence is larger than a pitch P of a transmittance irregularity (luminosity irregularity of a transmitted light ray) generated in the light diffuser, the adjacent rays of light forming irregularity diffuses, and the diffusing rays thereby overlap with each other. According to this, lowering of an image quality due to an irregularity can be suppressed.

(2) A laser image display apparatus according to the laser image display apparatus (1), wherein it is preferable that a light diffusing angle θ of the light diffuser, a numerical aperture NA of the illumination optical system, a distance L between the spatial light modulator and the light diffuser and a diagonal screen size D of the spatial light modulator have a relationship of $\tan(\theta/2 + \sin^{-1}(NA)) \times L < D/3$.

According to this construction, since a divergence of the rays of light after being diffused on the spatial light modulator is larger than a pitch P denoting an irregularity of the transmitted light rays, the adjacent rays of light forming irregularity diffuses, and thereby the rays overlap with each other. Accordingly, a deterioration of an image quality due to an irregularity can be suppressed. Further, since a half of a light divergence on the spatial light modulator is set smaller than one-third (i.e., D/3) of the diagonal distance of the image display area of the spatial modulator, the amount of light not entering the spatial light modulator (loss in the light amount) can be suppressed to 75% or lower. Accordingly, an image projected to the predetermined plane on a screen and the like can be recognized without sense of discomfort.

(3) As described above, it is preferable that the laser image display apparatus in the present invention comprises: a laser light source; a light diffuser containing light diffusing elements, the light diffusing elements moving, swaying or oscillating; an illumination optical system which irradiates rays of light from the laser light source to the light diffuser; a spatial light modulator which is arranged near the light diffuser and irradiated by rays of light diffused by the light diffuser to produce image; and a projection lens which projects to a predetermined plane in space an image produced by the spatial light modulator, wherein a light diffusing angle θ of the light diffuser, a numerical aperture NA of the illumination optical system, a distance L between the spatial light modulator and the light diffuser and a diagonal screen size D of the spatial light modulator have a relationship of $\tan(\theta/2+\sin^{-1}(NA))\times L < D/3$.

According to this construction, rays of light emitted from the laser light source are irradiated from the illumination optical system to the light diffuser. Light diffusing elements are contained in the light diffuser, and the rays of light irradiated from the illumination optical system are diffused by the light diffusing elements. At this time, since the light diffusing elements are moved, swayed or oscillated, a phase pattern of the diffused rays changes at each moment, and thereby a speckle pattern changes. In other words, since different speckle patterns are generated and these speckle patterns are timely averaged out at the time when an image projected to a particular plane via a spatial light modulator and a projection lens is observed, a high-quality two-dimensional image with a suppressed speckle noise can be obtained.

Further, divergence of the incident light rays from the illumination optical system to the light diffuser is expressed by $\sin^{-1}(NA)$. Assuming that a full angle of a light diffusing angle of the light diffuser is θ, a further divergence angle of θ/2 is added, and thereby a divergence angle of light rays is expressed by $\theta/2+\sin^{-1}(NA)$. Accordingly, if a length between the light diffuser and the spatial light modulator is L, a divergence of the ray of light on the spatial light modulator can be expressed by $2\times\tan(\theta/2+\sin^{-1}(NA))\times L$. By setting a half of a light divergence on the spatial light modulator smaller than one-third (i.e., D/3) of the diagonal distance of the image display area of the spatial modulator, the amount of light not entering the spatial light modulator (loss in the light amount) can be suppressed to 75% or lower. Accordingly, an image projected to the predetermined plane on a screen and the like can be recognized without sense of discomfort.

(4) A laser image display apparatus according to the laser image display apparatus in any one of (1) to (3), wherein it is preferable that the light diffusing elements move, sway or oscillate in response to a voltage applied to the light diffuser. According to this construction, a substance which can be moved swayed or oscillated by applying a voltage is used as a light diffusing element. One example of a substance of this kind is a particle including $TiBaO_3$ and the like which is able to undergo induced polarization. Here, for example, if an alternating voltage is applied to the light diffuser, migration particles can be moved, swayed or oscillated in response to modulated frequencies of the voltage. That is to say, a speckle pattern of the rays of light diffused by the light diffuser can be changed variously in response to the modulated frequencies of the voltage, and thereby a speckle noise can be reduced effectively.

(5) A laser image display apparatus according to the laser image display apparatus in (4), wherein it is preferable that the light diffuser has a plurality of electrodes, and a movement of the light diffusing elements is controlled by a voltage applied to each of the plurality of electrodes. According to this construction, for example, an alternating voltage is applied individually to a plurality of electrodes which the light diffuser includes. As a result, a different electric field is generated respectively among each of the electrodes, and thereby a movement of the light diffusing elements affected by the electric field differs among each of the electrodes. That is to say, for example, a speckle pattern of light diffused by the light diffuser can be changed in various ways in response to the modulated frequencies applied individually to the plurality of electrodes. Accordingly, a speckle noise can be reduced more effectively. Further, at this time, a movement of the light diffusing elements can be changed in more complicated way by adjusting an arrangement of the electrodes in such a way where an electric field is not applied in a parallel direction but being crossed. Accordingly, a speckle noise can be reduced more effectively.

(6) A laser image display apparatus according to the laser image display apparatus in any one of (1) to (3), wherein it is preferable that the light diffusing elements move, sway or oscillate in response to a heat applied to the light diffuser. According to this construction, it is not necessary to apply electricity or polarize the light diffusing elements, and the light diffusing elements can be moved swayed or oscillated without use of any objects. Further, since a movement such as moving speed of the light diffusing elements can also be changed variously by heat applied thereto. Accordingly, a speckle noise can be reduced effectively.

(7) A laser image display apparatus according to the laser image display apparatus in any one of (1) to (3), wherein it is preferable that the light diffusing elements move, sway or oscillate in response to a sound wave applied to the light diffuser. According to this construction, it is not necessary to apply electricity or polarize the light diffusing elements, and the light diffusing elements can be moved swayed or oscillated without use of any objects. Further, for example, if a sound wave having a modulated frequency which can be controlled is used, a speckle pattern of the rays of light diffused by the light diffuser can be changed variously by the modulated frequency. Accordingly, a speckle noise can be reduced effectively.

(8) A laser image display apparatus according to the laser image display apparatus in any one of (1) to (3), wherein it is preferable that the light diffusing elements move, sway or oscillate in response to a magnetic field applied to the light diffuser. According to this construction, a substance which can be moved, swayed or oscillated by applying a magnetic field is used as a light diffusing element. As such substance, particles made of various sorts of ferromagnetic substance or ferromagnetic substance can be used. Here, for example, if a modulated magnetic field generated by applying an alternating voltage to a coil is applied as a magnetic field to the light diffuser, the light diffusing elements can be moved, swayed or oscillated in response to the modulated frequencies of the applied voltage. That is to say, since a speckle pattern of the diffused light can be variously changed by the modulated frequencies of the voltage for generating a magnetic field, a speckle noise can be reduced effectively.

(9) A laser image display apparatus according to the laser image display apparatus in any one of (1) to (3), wherein it is preferable that the light diffusing elements are contained with a solvent, and the solvent moves, sways or oscillates. According to this construction, in the light diffuser, the solvent contained with the light diffusing elements moves, sways or oscillates. Accordingly, the light diffusing elements moves in response to a movement of the solvent even though the light diffusing elements are not directly moved, and thereby a speckle pattern of the rays of light diffused by the light diffuser differs at each moment. As a result, a high quality two-dimensional image having suppressed speckle noise can be obtained.

(10) A laser image display apparatus according to the laser image display apparatus in any one of (1) to (9), wherein it is preferable that the light diffusing elements include two or more kinds of substances having different features from one another. According to this construction, the light diffusing elements include two or more kinds of substances having different features such as polarization, size, mass or density. For example, in the case where particles have different polarization, if a voltage is applied to the light diffuser, movement of the light diffusing elements as a whole can be changed in more complicated state since each of two or more kinds of have different moving speed from one another. Accordingly, various speckle patterns are generated, and thereby a high quality two-dimensional image having suppressed speckle noise can be obtained.

(11) A laser image display apparatus according to the laser image display apparatus in any one of (1) to (5), wherein it is preferable that the light diffusing elements include two or more kinds of liquid crystals having different polarizations from one another. According to this construction, each of two or more kinds of liquid crystals having different polarizations from one another differs in a response speed from one another at the time when an electric field is applied. Accordingly, a diffusing pattern of rays of light in the light diffuser becomes various and many speckle patterns are formed, and thereby it is effective in speckle noise reduction.

(12) A laser image display apparatus according to the laser image display apparatus in any one of (1) to (10), wherein it is preferable that the light diffusing elements include two or more kinds of particles having different polarizations from one another. According to this construction, each of two or more kinds of particles having different polarization from one another differs in a response speed and the like from one another at the time when an electric field is applied. Accordingly, a diffusing pattern of rays of light in the light diffuser becomes various and many speckle patterns are formed, and thereby it is effective in speckle noise reduction.

(13) A laser image display apparatus according to the laser image display apparatus in any one of (1) to (12), wherein it is preferable that the light diffuser is integrated with the spatial light modulator. According to this construction, in the case where the light diffuser and the spatial light modulator are attached firmly to each other to be integrated, amount of rays of light diffused by the light diffuser and not irradiated to the spatial light diffuser can be suppressed to a minimum. Further, in the case where the light diffuser and the spatial light modulator are integrated with a predetermined distance kept therebetween, amount of rays of light not irradiated to the spatial light diffuser and, further, deterioration of an image quality caused by irregularities of a transmitted ray of light on the spatial light modulator can be suppressed. In any cases, a relative displacement between the light diffuser and the spatial light modulator caused by vibration and the like can be suppressed. Accordingly, a deterioration can be suppressed.

(14) A laser image display apparatus according to the laser image display apparatus in (13), wherein it is preferable that the spatial light modulator executes light modulation by a liquid crystal. According to this construction, since an orientation of a liquid crystal can be easily controlled in response to an input image signal provided electrically, intensity modulation can be executed effectively.

(15) A laser image display apparatus according to the laser image display apparatus in (14), wherein it is preferable the spatial light modulator executes light modulation by a reflective liquid crystal. According to this construction, since an incident ray of light to the spatial light modulator does not pass through a liquid crystal, a bright image having small loss in the light amount can be displayed.

(16) A laser image display apparatus according to the laser image apparatus in any one of (1) to (15), wherein it is preferable that: the laser light source comprises a laser light source emitting a ray of red laser light, a laser light source emitting a ray of blue laser light, and a laser light source emitting a ray of red laser light, the rays of laser light emitted from the laser light sources are combined to a single ray of laser light after being passed through the light diffusers, the illumination optical systems and the spatial light modulators which are arranged with the respective laser light sources, and the projection lens projects the combined laser light to a predetermined plane in space.

According to this construction, each of the three laser light sources of RGB colors (R: Red, G: Green, B: Blue) includes the light diffuser, the illumination optical system and the spatial light modulator. The rays of light emitted from the three laser light sources are irradiated to the light diffuser by the illumination optical system respectively. Since the light diffusing elements which are moved, swayed or oscillated are contained in the light diffuser, different speckle patterns occur at each moment. After the rays of light of three RGB colors having been passed through the spatial light modulator are combined to a single ray of laser light, the combined ray of light is projected to the predetermined plane in space. According to this, a laser image display apparatus capable of displaying a bright color image with suppressed speckle noise can be realized.

The present invention is described in detail; however, the descriptions above are exemplification of the present invention in all of the aspects, and the present invention is not limited to them. Indefinite numbers of modified examples may be envisioned within a scope of this invention.

INDUSTRIAL APPLICABILITY

The laser image display apparatus of the present invention serves as a laser image display apparatus comprising a means for reducing a speckle noise which appears on a display. The laser image display apparatus comprises one laser light source and a light diffuser in which light diffusing elements are contained so that a speckle noise can be reduced or eliminated by executing a light diffusion to rays of laser light without using a oscillating system such as screen, and thereby a bright image having no fine and irregular noise can be projected to a screen. Further, an optical system including a light diffuser is set in the most appropriate position so that loss of light amount after being executed a light diffusion is minimized, and thereby a bright and high-quality image having no luminosity irregularity can be realized.

The invention claimed is:
1. A laser image display apparatus comprising:
a laser light source;
a light diffuser containing light diffusing elements, the light diffusing elements moving, swaying or oscillating;
an illumination optical system which irradiates rays of light from the laser light source to the light diffuser;

a spatial light modulator which is arranged near the light diffuser and irradiated by rays of light diffused by the light diffuser to produce image; and a projection lens which projects to a predetermined plane in space an image produced by the spatial light modulator, wherein a light diffusing angle θ of the light diffuser, a pitch P of transmission irregularity generated in the light scattering means, a numerical aperture NA of the illumination optical system, and a distance L between the spatial light modulator and the light diffuser have a relationship of $P<2\times\tan(\theta/2+\sin^{-1}(NA))\times L$.

2. A laser image display apparatus according to claim 1, wherein a light diffusing angle θ of the light diffuser, a numerical aperture NA of the illumination optical system, a distance L between the spatial light modulator and the light diffuser and a diagonal screen size D of the spatial light modulator have a relationship of $\tan(\theta/2+\sin^{-1}(NA))\times L<D/3$.

3. A laser image display apparatus comprising:
a laser light source;
a light diffuser containing light diffusing elements, the light diffusing elements moving, swaying or oscillating;
an illumination optical system which irradiates rays of light from the laser light source to the light diffuser;
a spatial light modulator which is arranged near the light diffuser and irradiated by rays of light diffused by the light diffuser to produce image; and
a projection lens which projects to a predetermined plane in space an image produced by the spatial light modulator,
wherein a light diffusing angle θ of the light diffuser, a numerical aperture NA of the illumination optical system, a distance L between the spatial light modulator and the light diffuser and a diagonal screen size D of the spatial light modulator have a relationship of $\tan(\theta/2\sin^{-1}(NA))\times L<D/3$.

4. A laser image display apparatus according to claim 1, wherein the light diffusing elements move, sway or oscillate in response to a voltage applied to the light diffuser.

5. A laser image display apparatus according to claim 4, wherein the light diffuser has a plurality of electrodes, and movement of the light diffusing elements is controlled by a voltage applied to each of the plurality of electrodes.

6. A laser image display apparatus according to claim 1, wherein the light diffusing elements move, sway or oscillate in response to a heat applied to the light diffuser.

7. A laser image display apparatus according to claim 1, wherein the light diffusing elements move, sway or oscillate in response to a sound wave applied to the light diffuser.

8. A laser image display apparatus according to claim 1, wherein the light diffusing elements move, sway or oscillate in response to a magnetic field applied to the light diffuser.

9. A laser image display apparatus according to claim 1, wherein the light diffusing elements are contained with a solvent, and the solvent moves, sways or oscillates.

10. A laser image display apparatus according to claim 1, wherein the light diffusing elements include two or more kinds of substances having different features from one another.

11. A laser image display apparatus according to claim 1, wherein the light diffusing elements include two or more kinds of liquid crystals having different polarizations from one another.

12. A laser image display apparatus according to claim 1, wherein the light diffusing elements include two or more kinds of particles having different polarizations from one another.

13. A laser image display apparatus according to claim 1, wherein the light diffuser is integrated with the spatial light modulator.

14. A laser image display apparatus according to claim 13, wherein the spatial light modulator executes light modulation by a liquid crystal.

15. A laser image display apparatus according to claim 14, wherein the spatial light modulator executes light modulation by a reflective liquid crystal.

16. A laser image display apparatus according to claim 1, wherein:
the laser light source comprises a laser light source emitting a ray of red laser light, a laser light source emitting a ray of blue laser light, and a laser light source emitting a ray of red laser light,
the rays of laser light emitted from the laser light sources are combined to a single ray of laser light after being passed through the light diffusers, the illumination optical systems and the spatial light modulators which are arranged with the respective laser light sources, and
the projection lens projects the combined laser light to a predetermined plane in space.

17. A laser image display apparatus according to claim 3, wherein the light diffusing elements move, sway or oscillate in response to a voltage applied to the light diffuser.

18. A laser image display apparatus according to claim 3, wherein the light diffusing elements move, sway or oscillate in response to a heat applied to the light diffuser.

19. A laser image display apparatus according to claim 3, wherein the light diffusing elements move, sway or oscillate in response to a sound wave applied to the light diffuser.

20. A laser image display apparatus according to claim 3, wherein the light diffusing elements move, sway or oscillate in response to a magnetic field applied to the light diffuser.

21. A laser image display apparatus according to claim 3, wherein the light diffusing elements are contained with a solvent, and the solvent moves, sways or oscillates.

22. A laser image display apparatus according to claim 3, wherein the light diffusing elements include two or more kinds of substances having different features from one another.

23. A laser image display apparatus according to claim 3, wherein the light diffusing elements include two or more kinds of liquid crystals having different polarizations from one another.

24. A laser image display apparatus according to claim 3, wherein the light diffusing elements include two or more kinds of particles having different polarizations from one another.

25. A laser image display apparatus according to claim 3, wherein the light diffuser is integrated with the spatial light modulator.

26. A laser image display apparatus according to claim 3, wherein:
the laser light source comprises a laser light source emitting a ray of red laser light, a laser light source emitting a ray of blue laser light, and a laser light source emitting a ray of red laser light,
the rays of laser light emitted from the laser light sources are combined to a single ray of laser light after being passed through the light diffusers, the illumination optical systems and the spatial light modulators which are arranged with the respective laser light sources, and
the projection lens projects the combined laser light to a predetermined plane in space.

* * * * *

UNITED STATES PATENT AND TRADEMARK OFFICE
CERTIFICATE OF CORRECTION

PATENT NO. : 7,399,084 B2 Page 1 of 1
APPLICATION NO. : 10/576067
DATED : July 15, 2008
INVENTOR(S) : Akihiro Morikawa et al.

It is certified that error appears in the above-identified patent and that said Letters Patent is hereby corrected as shown below:

In column 15, line 14, claim 2, "diffusing angle θof the light" should read --diffusing angle θ of the light--.

In column 15, line 32, claim 3, "diffusing angle θof the light" should read --diffusing angle θ of the light--.

Signed and Sealed this

Tenth Day of March, 2009

JOHN DOLL
*Acting Director of the United States Patent and Trademark Office*